March 11, 1930.  R. J. EMMERT  1,750,312
SOLDERING APPARATUS
Filed April 29, 1925  3 Sheets-Sheet 3

Inventor
Rodger J. Emmert
By Spencer Sewall & Hardman
his Attorneys

Patented Mar. 11, 1930

1,750,312

UNITED STATES PATENT OFFICE

RODGER J. EMMERT, OF ANDERSON, INDIANA, ASSIGNOR, BY MESNE ASSIGNMENTS, TO DELCO-REMY CORPORATION, OF DAYTON, OHIO, A CORPORATION OF DELAWARE

SOLDERING APPARATUS

Application filed April 29, 1925. Serial No. 26,577.

This invention relates to soldering apparatus and particularly to apparatus for soldering together the terminal of parts of electrical apparatus such as terminals of a pair of field coils for a dynamo.

One object of the present invention is to provide a machine for automatically soldering together two terminals of a pair of magnet coils or similar articles in order that the cost of soldering such articles together may be materially reduced.

Further objects and advantages of the present invention will be apparent from the following description, reference being had to the accompanying drawings wherein a preferred embodiment of one form of the present invention is clearly shown.

Figure 1:
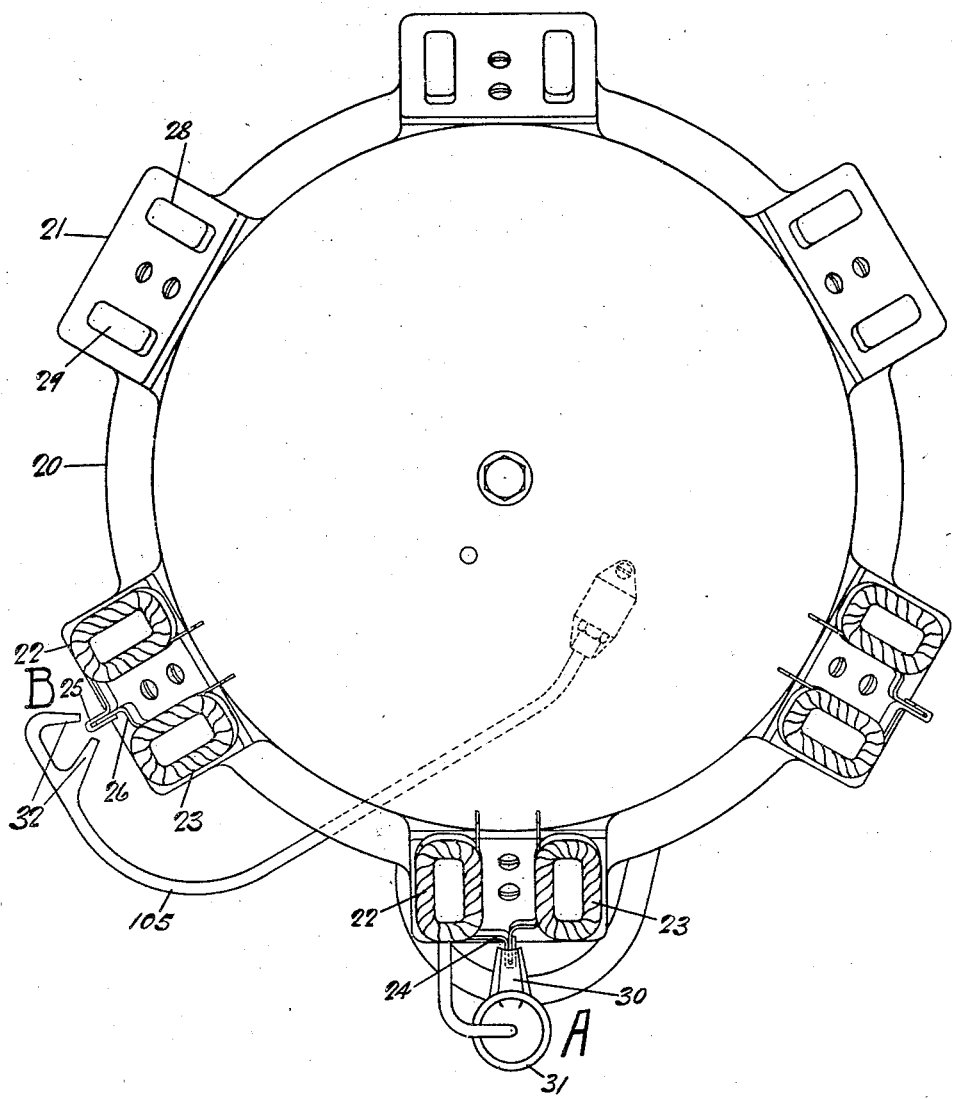
Fig. 1 is the plan view of a soldering machine embodying the present invention.

Referring to the drawings, 20 designates a table or conveyor having brackets 21 which are equally spaced and each adapted to receive the work to be soldered which in the present instance is a pair of field coils 22 and 23. One terminal 24 of the coil 22 is provided with a loop 25 for receiving a terminal 26 of the coil 23. Each bracket is provided with a pair of bosses 28 and 29 adapted, respectively to be received by the coils 22 and 23 and to maintain them in correct spaced relation with the terminals 25 and 26 in contact. It is the function of the machine to rotate the table 20 with a step by step motion in order to bring the work successfully to a station "A" where solder is applied to the terminals 25 and 26 from a spout 30 leading from a solder cup 31, and then to a station "B" where the excess solder is removed by jets of air issuing from the nozzles 32. The operator of the machine places the work upon the bracket 21 with the members to be joined by soldering in assembled relations. Flux is applied to the joint by a brush or other suitable device. Then the work is moved successively to stations A and B, and then to another station where the work is removed. While the machine automatically performs the succession of steps the operator has time to place the work upon the table and remove the completed work and apply the flux to the joint to be soldered.

The mechanism now to be described controls the movements of the table 20 and the flow of solder into the cup 31 and the flow of air into the nozzle 32.

Figure 2:
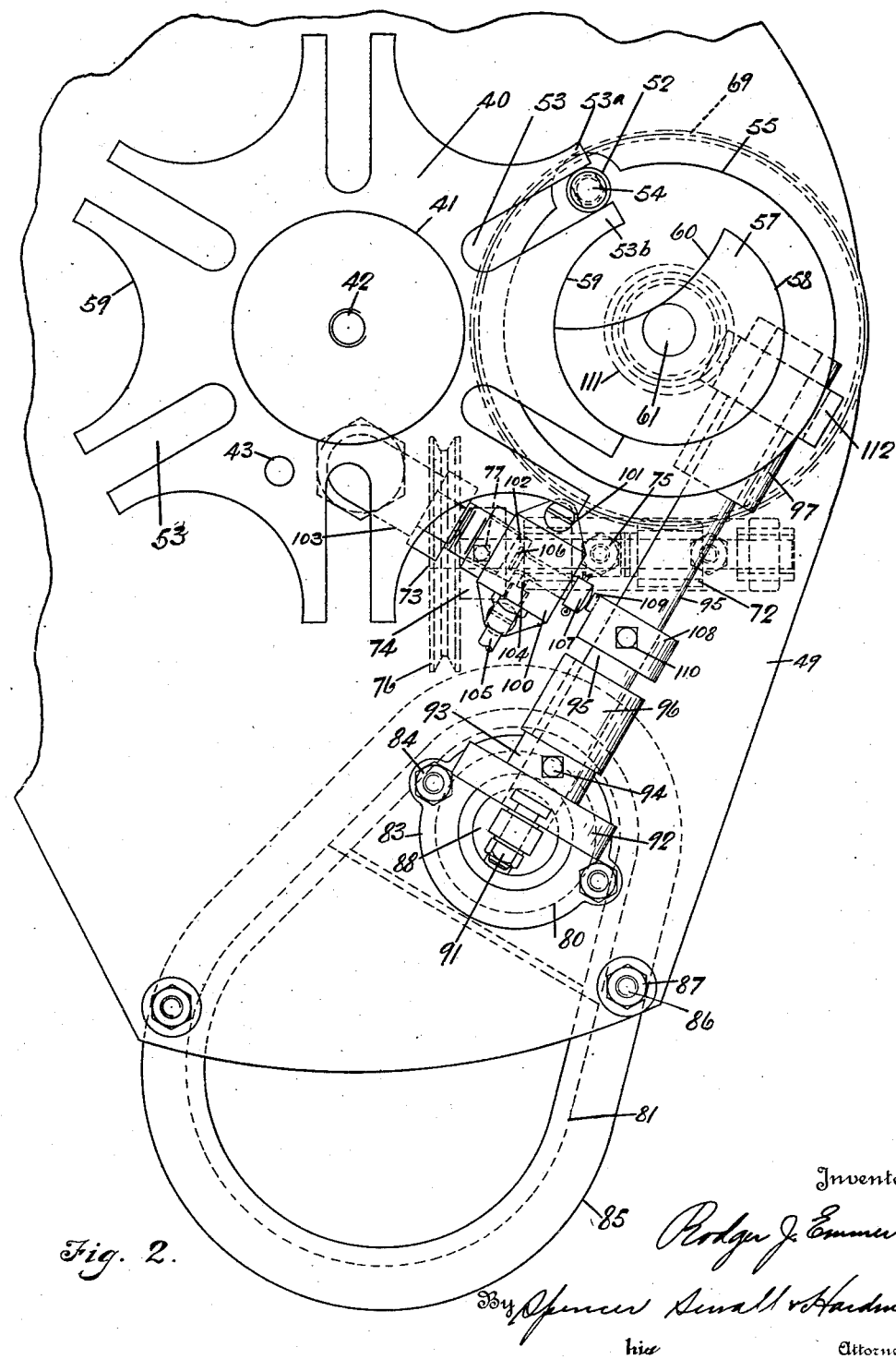
Fig. 2 is a plan view on a larger scale than Fig. 1 showing mechanism for operating the soldering machine and Fig. 3 is a side view of the apparatus shown in Fig. 2, certain parts shown in section.
Figure 3:
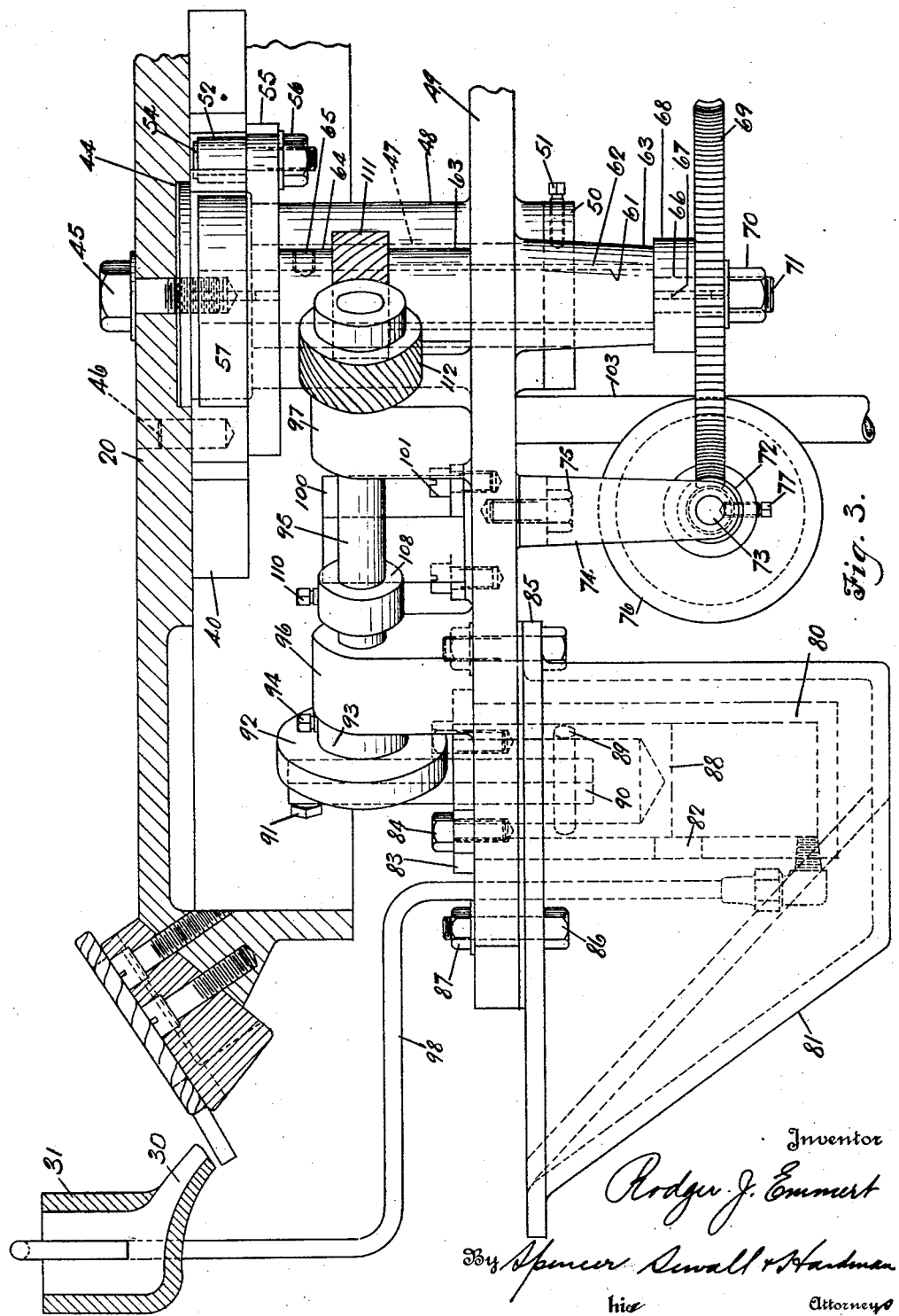

The table 20 is supported upon a Genevâ gear 40 having a circular boss 41 concentric with the axis of the gear which is provided with a tapped hole 42 and a plain hole 43. The table 20 is provided with a central recess 44 for receiving the boss 41. A bolt 45 engages the tapped hole 42, and a dowel pin 46 engages the hole 43 and maintains the table 20 in correct angular relation to the gear 40. Gear 40 is connected with a shaft 47 journalled within a bearing 48 formed integrally with a platform 49. Endwise movement of shaft 47 is limited by a collar 50 attached to the shaft by screw 51. The Geneva gear 40 is rotated by a roller 52 adapted to be received by each of the radial slots 53 of the gear. Roller 52 is supported by a bolt 54 attached to a disc 55 and retained by a nut 56 which engages the lower end of the bolt 54. As apparent from Fig. 2 the roller 52 cooperates with a slot 53 during approximately 120° of rotation of the disc 55. During the other 240° of motion of disc 55 the gear 40 is locked against rotation by a locking plate 57 having a cylindrical surface 58 engaging a surface 59 of a notch which is located between each of the slots 53 of the gear 40. The plate 57 is provided with a notch 60 to provide clearance for movement of the portions 53$^a$ and 53$^b$ which define the slot 53. It is apparent therefore, that rotation of the disc 55 will produce intermittent movement of the table 20. During the interval of time for each rotation of the disc 55, the table is moving during one-third of that interval and is stationary the remaining portion of the interval.

The disc 55 is mounted on shaft 61 journalled in a bearing 62 which is carried by bearing support 63 formed integrally with the platform 49. The disc 55 includes a hub 64 which is attached by screw 65 to the shaft 61. The lower end of the shaft 61 is reduced at 66 and is splined to receive a key 67 which attaches to the shaft portion 66 the hub 68 of a worm gear 69. The gear 69 is retained by a nut 70 which engages the lower end of the shaft extension 66. The worm gear 69 is driven by a worm 72 which is driven by a worm shaft 73 journalled upon a bracket 74 attached by screws 75 to the platform 49. The worm shaft 73 supports a grooved pulley 76 having its hub connected to the shaft 73 by screw 77.

The mechanism which intermittently supplies the solder cup 31 with a quantity of solder includes a solder pump comprising a cylinder 80 immersed in a solder vat 81 and having an inlet 82 located below the level of the solder within the vat. The upper end of the cylinder is provided with a flange 83 which is attached by screws 84 to the platform 49. The vat 81 is provided with a flange 85 attached by screws 86 and nuts 87 to the underside of the platform 49. The cylinder 80 receiving a plunger 88 attached by pin 89 and connecting rod 90 and a crank pin 91 to the crank disc 92 having its hub 93 connected by screw 94 with a shaft 95 which is carried by brackets 96 and 97 integral with the platform 49. Obviously during the upward movement of the plunger solder will flow into the cylinder 80; and, during the downward movement of the plunger, solder will flow through pipe 98 into the solder cup 31. By means not shown the vat 81 and the cup 31 are heated to maintain the solder in a molten state.

The mechanism for controlling the passage of air through the nozzles 32 at station B includes a valve body 100 which is attached by screws 101 to the platform 49. The valve body 100 is provided with an inlet passage 102 connected with an inlet pipe 103, and with an outlet passage 104 connected with a pipe 105 which terminates in the air nozzle 32. The flow of air from the passage 102 to the passage 104 is controlled by a valve 106 cooperating with a seat which is provided by the valve body 100. The valve 106 is connected with a cam follower 107 cooperating with a cam 108 having a single lobe 109. The cam 108 is attached to the shaft 95 by a screw 110. Obviously for each rotation of the shaft 95 the valve will be opened at once and the opening of the valve will occur as soon as the work has been brought to the station B opposite the air nozzles 32.

The shaft 95 is driven from the shaft 61 by means of spiral gears 111 and 112 which are connected respectively with shaft 61 and shaft 95. The operation of the solder pump and the air valve will occur as soon as the work has been brought into stations A and B respectively. The solder cup 31 will receive a quantity of solder, and at the same time the work at the station B will be subjected to jets of air from the nozzles 32 which remove the excess solder from the work. The excess solder is caught by the vat 81 which extends out vertically below the spout 30 and the joint to be soldered.

While the form of embodiment of the invention as herein disclosed, constitutes a preferred form it is to be understood that other forms might be adopted, all coming within the scope of the claims which follow.

What is claimed is as follows:

1. Soldering apparatus comprising, in combination, a duct for receiving molten solder and supplying it to the work in the molten state, an air nozzle for directing a jet of air upon the work to remove the excess solder, means for conveying the work successively adjacent the solder duct and the air nozzle, means for causing molten solder to issue from the duct when the work is adjacent the duct, and means for causing air to be supplied to said nozzle when the work is adjacent the nozzle.

2. Soldering apparatus comprising, in combination, a duct for receiving molten solder and supplying it to the work in the molten state, an air nozzle for directing a jet of air upon the work, a solder vat, a pump for forcing molten solder from the vat into the duct, a valve for controlling the delivery of air under pressure to said nozzle, a work conveyor, and means for automatically causing the pump to operate and the air valve to open when the work is brought adjacent the solder duct and air nozzle.

3. Soldering apparatus comprising, in combination, a duct for receiving molten solder and supplying it to the work in the molten state, an air nozzle for directing a jet of air upon the work, means for conveying the work successively adjacent the solder duct and the air nozzle, and means for causing the conveyor to move intermittently, to move the work successively adjacent the molten solder duct and air nozzle and to cause solder to issue from the duct and air from the nozzle while the conveyor is at rest.

4. Soldering apparatus comprising, in combination, a duct for receiving molten solder and supplying it to the work in the molten state, an air nozzle for directing a jet of air upon the work, a solder vat, a pump for forcing molten solder from the vat into the duct, a valve for controlling the delivery of air under pressure to said nozzle, a work conveyor, and means for causing the conveyor to move intermittently, to move the work successively adjacent the solder duct and air nozzle, and to cause the pump to operate and the air valve to open when the conveyor is at rest.

5. Soldering apparatus comprising, in combination, a rotatable conveyor table carrying a plurality of work receiving brackets equi-angularly spaced, a molten solder duct and an air nozzle disposed adjacent the path of movements of said brackets and the work thereon and spaced apart corresponding to the spacing of the brackets, and means for causing the table to rotate intermittently to bring certain brackets opposite the duct and nozzle, and to cause molten solder to issue from the duct and air from the nozzle while the table is at rest.

6. Soldering apparatus comprising, in combination, a duct for receiving molten solder and supplying it to the work in a molten state, a nozzle for directing a jet of cooling fluid upon the work, means for conveying the work successively adjacent the duct and nozzle, means for causing molten solder to issue from the duct only when the work is adjacent the duct, and means for causing cooling fluid to issue from the nozzle upon the work only when the work is adjacent the nozzle.

7. Soldering apparatus comprising, in combination, a duct for receiving molten solder and supplying it to the work in a molten state, means for cooling the work and for cleaning the excess solder from the work, means for conveying the work successively adjacent the duct and work cooling and cleaning means, means for causing molten solder to issue from the duct only when the work is adjacent the duct, and means for causing the cooling means to operate only when the work is adjacent thereto.

8. Soldering apparatus comprising, in combination, a work conveyor, a solder vat, a solder duct from which solder is directed upon the work, means for causing molten solder to flow from the vat to the duct only when the work is located by the conveyor adjacent the duct.

9. Soldering apparatus comprising, in combination, a work conveyor, a solder vat, a cup located above the work and having a duct for directing molten solder upon the work, a displacement pump for forcing solder from the vat into the cup, and means for causing the pump to force the solder into the cup only when the work is adjacent the duct.

10. In a soldering apparatus for joining the terminals of coils, the combination of a solder applying device with a conveyor for feeding the coils to the solder applying device, said conveyor including a bracket having a pair of bosses to receive the coils and to maintain the coils in correct spaced relation so that the terminals to be joined are in contact.

In testimony whereof I hereto affix my signature.

RODGER J. EMMERT.